(12) United States Patent
Feng et al.

(10) Patent No.: US 11,515,659 B2
(45) Date of Patent: Nov. 29, 2022

(54) ELECTRONIC DEVICE WITH RECOGNIZABLE SHELL AND MANUFACTURING METHOD FOR THE RECOGNIZABLE COVERING PLATE

(71) Applicant: LUXSHARE PRECISION INDUSTRY Co., Ltd., Shenzhen (CN)

(72) Inventors: Yun Feng, Shenzhen (CN); Kenny Yi, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 155 days.

(21) Appl. No.: 17/184,000

(22) Filed: Feb. 24, 2021

(65) Prior Publication Data

US 2021/0184388 A1  Jun. 17, 2021

(30) Foreign Application Priority Data

Mar. 2, 2020  (CN) .......................... 202010135987.3
Mar. 2, 2020  (CN) .......................... 202020237792.5

(51) Int. Cl.
*H01R 13/46* (2006.01)
*H01R 13/502* (2006.01)
*H01R 43/18* (2006.01)

(52) U.S. Cl.
CPC ......... *H01R 13/465* (2013.01); *H01R 13/502* (2013.01); *H01R 43/18* (2013.01)

(58) Field of Classification Search
CPC ..... H01R 13/465; H01R 13/502; H01R 43/18
USPC .......................................... 439/736
See application file for complete search history.

(56) References Cited

U.S. PATENT DOCUMENTS

| 3,647,405 A | * | 3/1972 | Smith | F23G 5/02 |
| | | | | 4/DIG. 9 |
| 4,108,806 A | * | 8/1978 | Cohrs | B29C 70/66 |
| | | | | 523/205 |
| 6,004,641 A | * | 12/1999 | Tettamble | C08J 9/32 |
| | | | | 428/314.2 |

(Continued)

FOREIGN PATENT DOCUMENTS

| CN | 103756351 A | 4/2014 |
| TW | I238108 B | 8/2005 |

(Continued)

*Primary Examiner* — Alexander Gilman
(74) *Attorney, Agent, or Firm* — Birch, Stewart, Kolasch & Birch, LLP

(57) ABSTRACT

An electronic device with a recognizable shell is provided. At least a portion of the recognizable shell is manufactured by a method including mixing a plastic material and a color material to obtain a mixture material, increasing an environment temperature of the mixture material to a preheating temperature lower than the plastic material melting point, increasing the environment temperature above the preheating temperature, increasing the environment temperature to a temperature 5 to 10 degrees above the plastic material melting point; increasing the environment temperature above the color material melting point, injecting the mixture material in a mold cavity of a mold, maintaining the mold in under a molding pressure, and obtaining the cooled mixture material as the portion. A manufacturing method for recognizable covering plate is also provided.

20 Claims, 8 Drawing Sheets

(56) References Cited

U.S. PATENT DOCUMENTS

| | | | |
|---|---|---|---|
| D599,205 S * | 9/2009 | Zeyfang | D9/456 |
| 8,551,589 B2 * | 10/2013 | Hutchinson | B29C 49/22 |
| | | | 428/36.6 |
| 9,579,869 B2 * | 2/2017 | Qin | C08G 18/4866 |
| 9,757,910 B2 * | 9/2017 | Manzaki | B29C 35/0266 |
| 10,530,853 B2 * | 1/2020 | Fan | H04W 4/50 |
| 2004/0005442 A1 * | 1/2004 | Sekine | B29C 45/0053 |
| | | | 428/207 |
| 2004/0197545 A1 * | 10/2004 | Gehlsen | C08J 9/32 |
| | | | 428/354 |
| 2005/0186396 A1 * | 8/2005 | Okajima | B29C 48/21 |
| | | | 428/167 |
| 2009/0169821 A1 * | 7/2009 | Takeuchi | B60J 10/15 |
| | | | 428/156 |
| 2012/0015162 A1 * | 1/2012 | Lion | B32B 27/12 |
| | | | 428/206 |
| 2021/0184388 A1 * | 6/2021 | Feng | G09F 3/20 |

FOREIGN PATENT DOCUMENTS

| | | |
|---|---|---|
| TW | M481122 U | 7/2014 |
| TW | M484217 U | 8/2014 |

* cited by examiner

ELECTRONIC DEVICE WITH RECOGNIZABLE SHELL AND MANUFACTURING METHOD FOR THE RECOGNIZABLE COVERING PLATE

CROSS-REFERENCE TO RELATED APPLICATION

This non-provisional application claims priority under 35 U.S.C. § 119(a) to Patent Application No. 202010135987.3 and 202020237792.5 filed in China, P.R.C. on Mar. 2, 2020, the entire contents of which are hereby incorporated by reference.

BACKGROUND

Technical Field

The present disclosure relates to consumer electronics. In particular, to an electronic device a recognizable shell and a manufacturing method for a recognizable covering plate.

Related Art

At present, to most of the people, different kinds of electronic devices (e.g., smart phones, personal computers, tablet computers) become part of their lives. Due the commonly uses of the electronic devices, accessories or peripheral products for the electronic devices, e.g., transmission cables, adapters, car chargers, Bluetooth speakers, wireless charging plates, or the like are also available to the market. To meet different user requirements, accessories or peripheral products with different structures and configurations are continuously developed even if these products may have same functions. However, since the appearances of the accessories for the electronic devices are substantially the same. As a result, the user sometimes cannot distinguish his or her own accessories from others when his or her accessory is lost.

SUMMARY

Since consumer electronics (e.g., mobile phones, tablet computers, or the like) with the same serial number or similar serial numbers are commonly manufactured by same processes, theses electronic devices may have the same appearances. Accordingly, users may decorate their devices with accessories (such as phone charms, phone shells, and phone cases) to allow their devices become more recognizable. Similarly, since there is a problem that the electronic device accessories or peripheral products having non-uniform patterns cannot be manufactured, the electronic device accessories or peripheral products known to the inventor(s) have single colors, thereby causing poorer recognizability for the accessories or peripheral products (for instance, the user may misrecognize other accessories or peripheral products as his or her owns). On the other hand, in some cases, the accessories or peripheral products are colored by spray coating or anodization process after the product is manufactured. However, it is understood that, after these products are used for a period of time, the surfaces of the accessories or peripheral products may be worn so as to change the colors of the accessories or peripheral products.

In view of these, according to some embodiments, an electronic device is provided. The electronic device comprises a recognizable shell and an electronic component, and the electronic component is received in the recognizable shell. The recognizable shell has an exposed surface, and the exposed surface has a non-uniform pattern. A portion of the recognizable shell corresponding to the exposed surface is manufactured by a manufacturing method. The manufacturing method comprises mixing a plastic material with a color material so as to obtain a mixture material, wherein a melting point of the color material is higher than a melting point of the plastic material; propelling the mixture material and increasing an environment temperature of the mixture material to a preheating temperature, wherein the preheating temperature is lower than the melting point of the plastic material; continuously propelling the mixture material and increasing the environment temperature of the mixture material to above the preheating temperature until the plastic material is in liquid state and the color material is in solid state, such that a mobility of the plastic material is higher than a mobility of the color material; continuously propelling the mixture material and increasing the environment temperature of the mixture material to a temperature 5 to 10 degrees above the melting point of the plastic material; continuously propelling the mixture material and increasing the environment temperature of the mixture material to above the melting point of the color material until the plastic material and the color material are in liquid state; injecting the mixture material in a mold cavity of a mold; maintaining the mold under a molding pressure; and obtaining a cooled mixture material as the portion of the recognizable shell.

According to some embodiments, a manufacturing method for the recognizable covering plate is provided. The manufacturing method comprises mixing a plastic material with a color material so as to obtain a mixture material, wherein a melting point of the color material is higher than a melting point of the plastic material; propelling the mixture material and increasing an environment temperature of the mixture material to a preheating temperature, wherein the preheating temperature is lower than the melting point of the plastic material; continuously propelling the mixture material and increasing the environment temperature of the mixture material to above the preheating temperature until the plastic material is in liquid state and the color material is in solid state, such that a mobility of the plastic material is higher than a mobility of the color material; continuously propelling the mixture material and increasing the environment temperature of the mixture material to a temperature 5 to 10 degrees above the melting point of the plastic material; continuously propelling the mixture material and increasing the environment temperature of the mixture material to above the melting point of the color material until the plastic material and the color material are in liquid state; injecting the mixture material in a mold cavity of a mold; maintaining the mold under a molding pressure; and obtaining a cooled mixture material as the recognizable covering plate.

Based on the above, according to one or some embodiment of the instant disclosure, a recognizable covering plate or recognizable shell having a non-uniform pattern is provided. Therefore, when the recognizable covering plate or recognizable shell is arranged on the accessory or the peripheral product (e.g., the transmission cable, the power adapter, the car charger, the Bluetooth speaker, the wireless charging plate, the wired/wireless earphone, extension device for power, data, or media, or the like), the accessory or the peripheral product of the electronic device will have a unique recognizability due to the non-uniform pattern on the covering plate or shell. Furthermore, after the accessory or the peripheral product of the electronic device is used for a period of time, the color on the surface of the accessory or the peripheral product does not fade due to physical wears to the non-uniform pattern.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
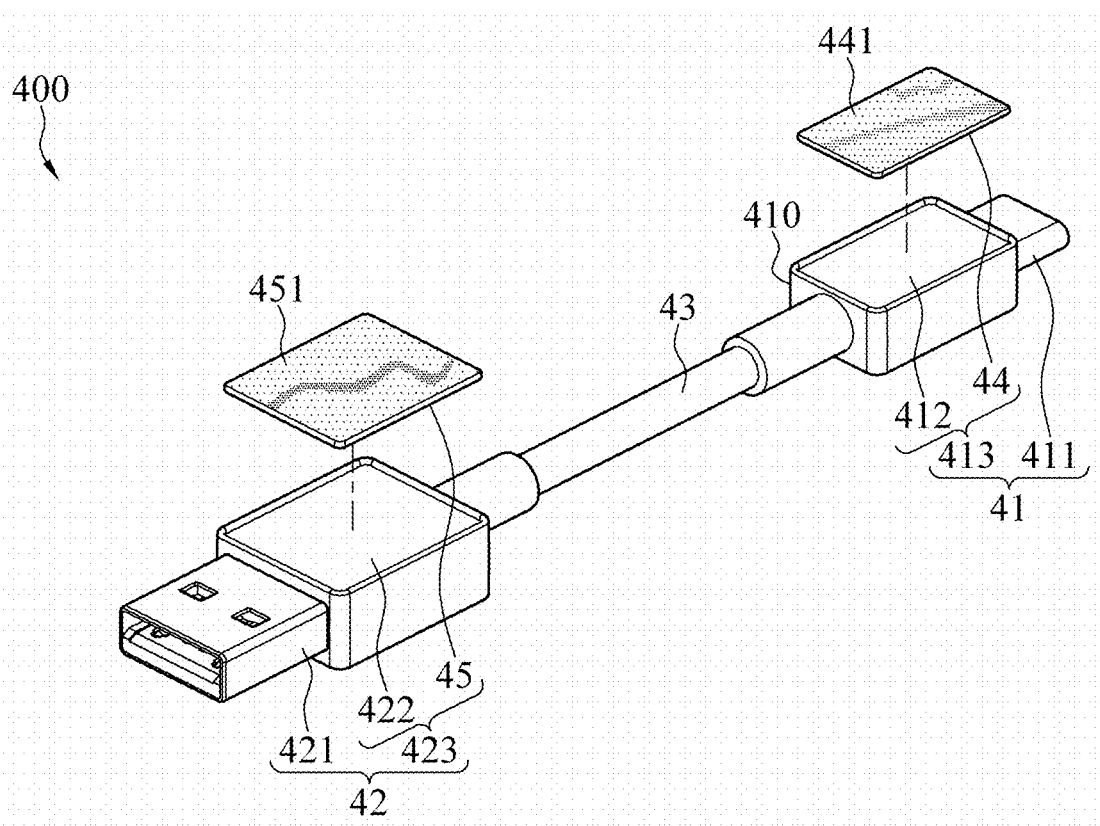
FIG. 1 illustrates a perspective view of a transmission cable with recognizable shell according to an exemplary embodiment of the instant disclosure.

According to one or some embodiments, an electronic device with recognizable shell is provided. The electronic device may be different kinds of accessories or peripheral products, for example, but not limited to a transmission cable, a power adapter, a car charger, a Bluetooth speaker, a wireless charging plate, a wired/wireless earphone, an extension device for power, data, or media, or the like. In one embodiment, the electronic device with recognizable shell comprises a recognizable shell and an electronic component, and the electronic component is received in the recognizable shell. The recognizable shell has an exposed surface, the exposed surface has a non-uniform pattern, and a portion of the recognizable shell corresponding to the exposed surface is manufactured by a manufacturing method described as following. Please refer to FIG. 1. FIG. 1 illustrates a perspective view of a transmission cable 400 with recognizable shell according to an exemplary embodiment of the instant disclosure. In this embodiment, the electronic device with recognizable shell is a transmission cable 400. The recognizable shell further comprises a first recognizable shell 413 and a second recognizable shell 423. The electronic component comprises a connector 411 and a connection port 421. The transmission cable 400 may be a data transmission cable, a power transmission cable, or may be a data/power transmission cable. Therefore, the transmission cable 400 can be provided for connection between electronic devices to achieve the data transmission between the electronic devices, or for connection between an electronic device and the mains supply for electricity transmission from the mains supply to the electronic device. The transmission cable 400 comprises a first connection end 41, a second connection end 42, a cable body 43, and a recognizable covering plate 44. The first connection end 41 has a connector 411 and a first recognizable shell 413. In this embodiment, the first recognizable shell 413 comprises a first covering portion 412 and a recognizable covering plate 44 disposed on the first covering portion 412, but embodiments are not limited thereto. In some embodiment, the recognizable covering plate 44 and the first covering portion 412 may be integrally formed as a one-piece member. The second connection end 42 has a connection port 421 and a second recognizable shell 423. In this embodiment, the second recognizable shell 423 comprises a second covering portion 422 and a recognizable covering plate 45 disposed on the second covering portion 422, but embodiments are not limited thereto. In some embodiments, the recognizable covering plate 45 and the second covering portion 422 may be integrally formed as a one-piece member. For example, in this embodiment, the first connection end 41 may correspond to a USB type-C connector, and the second connection end 42 may correspond to a USB type-A connector, but embodiments are not limited thereto. In some embodiments, the first connection end 41 and the second connection end 42 may be of connection interfaces different from that in this embodiment, or may be of the same connection interfaces (e.g., the first connection end 41 and the second connection end 42 may be both USB type-C connectors). The cable body 43 is provided for electrically connecting the connector 411 with the connection port 421. Accordingly, when the connector 411 of the first connection end 41 is connected to an electronic device and the connection port 421 of the second connection end 42 is connected to another electronic device (or connected to the mains supply through a power adapter), signal or power transmission between the electronic devices or between the electronic device and the main supply can be achieved. In this embodiment, the first recognizable shell 413 has an exposed surface, and the exposed surface has a non-uniform pattern, but embodiments are not limited thereto. In some embodiments, a portion of the first recognizable shell 413 has an exposed surface, and the exposed surface has a non-uniform pattern. In other words, the non-uniform pattern may be on the entire first recognizable shell 413 or may be on a portion of the first recognizable shell 413. As shown in FIG. 1, in one embodiment, the recognizable covering plate 44 of the first recognizable shell 413 is at the first covering portion 412 and has an exposed surface 441, and the exposed surface 441 has a non-uniform pattern. In some embodiments, the second recognizable shell 423 has an exposed surface, and the exposed surface has a non-uniform pattern, but embodiments are not limited thereto. In some embodiments, a portion of the second recognizable shell 423 has an exposed surface, and the exposed surface has a non-uniform pattern. In other words, the non-uniform pattern may be on the entire second recognizable shell 423 or may be on a portion of the second recognizable shell 423. As shown in FIG. 1, in one embodiment, the recognizable covering plate 45 of the second recognizable shell 423 is at the second covering portion 422 and has an exposed surface 451, and the exposed surface 451 has a non-uniform pattern. Accordingly, the first recognizable shell 413 and/or the second recognizable shell 423 of the transmission cable 400 may have the non-uniform pattern, thereby improving the recognizablity of the transmission cable 400. In the following paragraphs, the manufacturing method for the recognizable covering plates 44, 45 is described. It is understood that, the manufacturing method is also suitable for manufacturing recognizable components having a non-uniform pattern (the recognizable components may be a portion of the first recognizable shell 413 having the non-uniform pattern or a portion of the second recognizable shell 423 having the non-uniform pattern).

Figure 2:
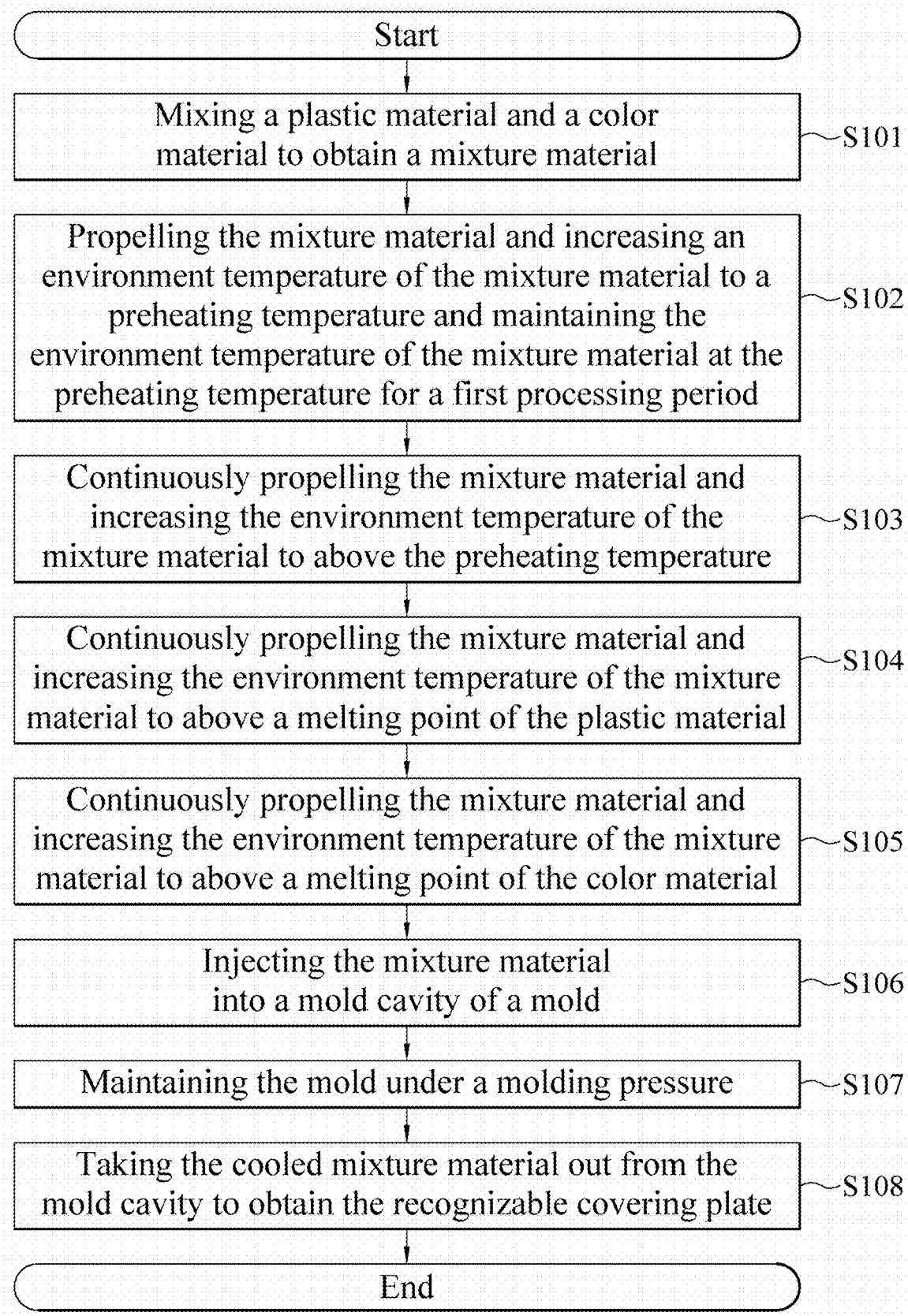
FIG. 2 illustrates a flowchart of a manufacturing method for recognizable covering plate according to an exemplary embodiment of the instant disclosure.

Please refer to FIG. 2. FIG. 2 illustrates a flowchart of a manufacturing method for recognizable covering plate. As shown, the manufacturing method for recognizable covering plate comprises following steps.

Step S101, mixing a plastic material and a color material to obtain a mixture material.

Step S102, propelling the mixture material and increasing an environment temperature of the mixture material to a preheating temperature and maintaining the environment temperature of the mixture material at the preheating temperature for a first processing period.

Step S103, continuously propelling the mixture material and increasing the environment temperature of the mixture material to above the preheating temperature.

Step S104, continuously propelling the mixture material and increasing the environment temperature of the mixture material to above a melting point of the plastic material.

Step S105, continuously propelling the mixture material and increasing the environment temperature of the mixture material to above a melting point of the color material.

Step S106, injecting the mixture material into a mold cavity of a mold.

Step S107, maintaining the mold under a molding pressure.

Step S108, taking the cooled mixture material out from the mold cavity to obtain the recognizable covering plate (or the recognizable component).

Figure 3:
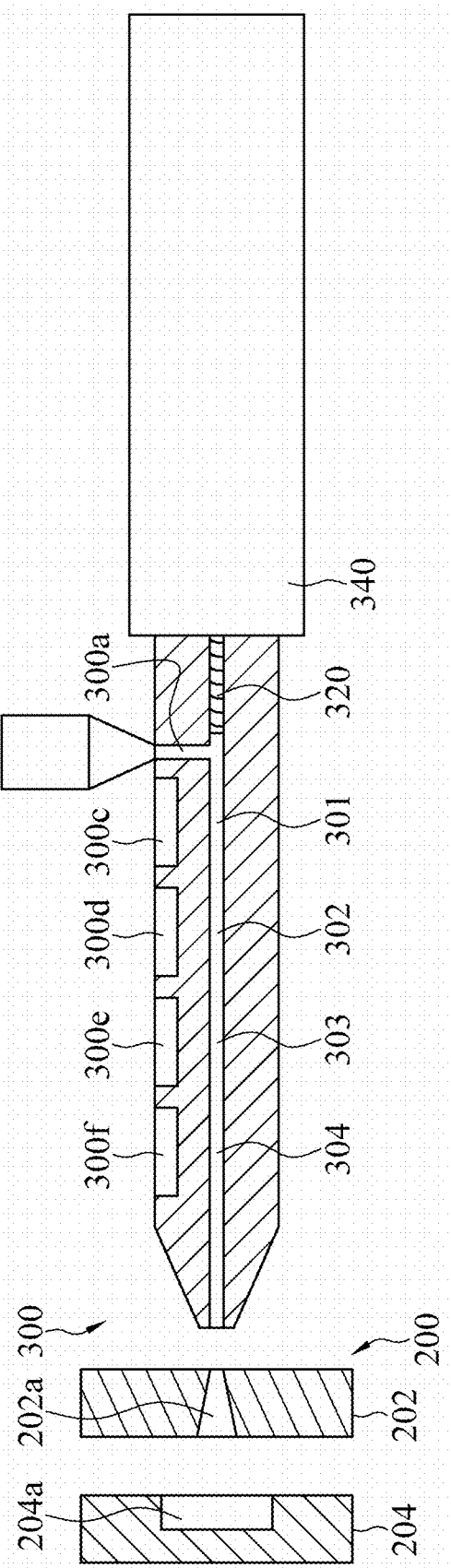
FIG. 3 illustrates a schematic cross-sectional view of an injection molding device used in the manufacturing method for recognizable covering plate according to an exemplary embodiment of the instant disclosure.

In order to understand the manufacturing method clearly, please further refer to FIG. 3. FIG. 3 illustrates a schematic cross-sectional view of an injection molding device used in the manufacturing method for recognizable covering plate according to an exemplary embodiment of the instant disclosure, where the injection molding device comprises a mold 200 and a preparation chamber 300. In this embodiment, the plastic material and the color material are mixed in the preparation chamber to be the mixture material (step S101). Specifically, in one embodiment, the plastic material and the color material may be extruded into the preparation chamber 300 through a single-screw extruder. In some embodiments, the injection molding device may have a double-screw extruder, and the plastic material and the color material are extruded into the preparation chamber 300 through different screws. Alternatively, in some embodiments, the injection molding device may have a multi-screw extruder, so that additional materials (such as another color material, hardness enhancing materials, or the like), so that the manufactured recognizable covering plate can meet different application requirements.

As shown in FIG. 3, the preparation chamber 300 comprises a first heating section 301, a second heating section 302, a third heating section 303, and a fourth heating section 304 in communication with each other. The first heating section 301 is in communication with a material inlet 300a of the preparation chamber 300, and the fourth heating section 304 is in communication with a nozzle 300b of the preparation chamber 300. The material inlet 300a is provided for extruding the plastic material and the color material into the preparation chamber 300 through the extruder, and the nozzle 300b is provided for injecting the mixture material into the mold from the preparation chamber 300. The preparation chamber 300 has several heating devices 300c, 300d, 300e, 300f respectively corresponding to environment temperatures for different heating sections (namely, the first heating section 301, the second heating section 302, the third heating section 303, and the fourth heating section 304). It is understood that, the positions of the heating devices 300c, 300d, 300e, 300f shown in FIG. 3 is for an illustrative purpose, but not limitations to the instant disclosure.

Please refer to FIGS. 2 and 3, in the step S101, the plastic material and the color material are mixed to obtain the mixture material, and the melting point of the color material is higher than the melting point of the plastic material. In some embodiments, the melting point of the color material is higher than the melting point of the plastic material by 5 to 45 degrees. In some other embodiments, the melting point of the color material is higher than the melting point of the plastic material by 15 to 20 degrees. Next, in the step S102, the mixture is propelled and the environment temperature of the mixture material is increased to the preheating temperature in the first heating section 301 of the preparation chamber 300 and is maintained for a first processing period.

In one or some embodiments, the step S101 may be performed in the material inlet of the preparation chamber 300, but embodiments are not limited thereto. In some other embodiments, the step S101 may be performed in the first heating section 301 of the preparation chamber 300, namely, in these embodiments, the mixing and the preheating of the material may be both performed in the first heating section 301.

In one or some embodiments, the preheating temperature is lower than the melting point of the plastic material by 15 to 35 degrees. In one or some embodiments, the preheating temperature is lower than the melting point of the plastic material by 20 to 30 degrees.

In one or some embodiments, a weight percentage of the color material is about in a range between 0.5% and 6.5% in the mixture material. In some other embodiments, the weight percentage of the color material is about 4% in the mixture material. For example, when the color of the color material has a higher color rendering (higher contrast), less color material may be used in the mixture material. On the other hand, when the color of the color material has a lower color rendering (lower contrast), more color material may be used in the mixture material. Accordingly, the color rendering performance of the product for different requirements can be achieved.

In one or some embodiments, the plastic material comprises at least one selected from a group consisting of acrylonitrile butadiene styrene (ABS) copolymer, polypropylenes (PP), polycarbonate (PC), thermoplastic elastomer (TPE), thermoplastic polyurethane (TPU), and silicone.

On the other hand, the color material may further comprise a paint, a carrier, and an additive. In this embodiment, the carrier is a thermoplastic resin, thereby effectively rinsing and dispersing the paint, but embodiments are not limited thereto. The carrier of the color material may be selected to correspond to the material of the plastic material. The paint may be organic paints (for example, but not limited to, phthalocyanine compounds and diazo compounds) or inorganic paints (for example, but not limited to, cadmium-based compounds and oxide-based compounds). The additive of the color material may be a dispersing agent or an additive agent. The dispersing agent can disperse the paint uniformly without aggregation. For example, the dispersing agent may be stearates. The additive agent is added for achieving certain purposes (e.g., flame retardant, brightening, antibacterial, antistatic, and antioxidation purposes).

Next, in the step S103, the mixture is continuously propelled and the environment temperature of the mixture material is increased to above the preheating temperature in the second heating section 302 of the preparation chamber 300, until the plastic material is in liquid state and the color material is in solid state, such that the mobility of the plastic material is greater than the mobility of the color material. Namely, in this embodiment, the viscosity of the plastic material is less than the viscosity of the color material. Specifically, in this embodiment, the environment temperature of the mixture material may be heated to above the preheating temperature and to come close to the melting point of the plastic material, such that the plastic material is in liquid state while the color material remains in solid state. Owing to the mobility difference between the plastic material and the color material, when the mixture is continuously propelled, the plastic material and the color material are mixed non-uniformly in a non-uniform mixing manner, thereby generating the non-uniform pattern. In one or some embodiments, the environment temperature of the mixture material is increased to a temperature about 5 degrees above the preheating temperature.

Then, in the step S104, the mixture is continuously propelled and the environment temperature of the mixture material is increased to a temperature about 5 to 10 degrees above the melting point of the plastic material in the third heating section 303 of the preparation chamber 300. Accordingly, since the environment temperature of the mixture material is increased to a temperature about 5 to 10 degrees above the melting point of the plastic material, the mobility of the plastic material in the mixture material is further improved. In this step, the mobility difference between the plastic material and the color material changes as compared with the mobility difference between the plastic material and the color material in the previous step. Therefore, when the mixture is continuously propelled, the manner for the non-uniform mixing between the plastic material and the color material changes again to generate more various patterns.

Next, in the step S105, the mixture is continuously propelled and the environment temperature of the mixture material is increased to above the melting point of the color material in the fourth heating section 304 of the preparation chamber 300, until both the plastic material and the color material are in liquid state. In one or some embodiments, the environment temperature of the mixture material is increased to a temperature about 10 degrees above the melting point of the color material. Accordingly, since the environment temperature of the mixture material is increased to above the melting point of the color material, both the plastic material and the color material are in liquid state. In this step, the mobility difference between the plastic material and the color material is less than the mobility difference between the plastic material and the color material in the previous step, thereby allowing the mixture material to have a proper mobility. Hence, when the mixture material is injected into the mold, the mixture material may be dispersed uniformly, thereby allowing the pattern on the recognizable shell or the recognizable component to have different possible variations.

Next, in the step S106, the mixture material in liquid state is injected into a mold cavity 204a of a mold 200 through the nozzle 300b of the preparation chamber 300. As shown in FIG. 3, the mold 200 comprises a male mold portion 202 and a female mold portion 204 detachably assembled with each other. The male mold portion 202 has a gate 202a, and the female mold portion 204 has a mold cavity 204a corresponding to the gate 202a. Accordingly, when the mixture material undergoes the temperature treatment so as to be suitable for being injected into the mold 200, the male mold portion 202 and the female mold portion 204 are fixed with each other (namely, the mold is clamped), and then, the mixture material is injected from the nozzle 300b of the preparation chamber 300 into the mold cavity 204a of the female mold portion 204 through the gate 202a of the male mold portion 202.

Next, in the step S107, the mold 200 is maintained under a molding pressure. In this embodiment, the molding pressure is 95 bar. Accordingly, the mixture material can be molded in the mold 200 under a proper molding pressure.

Last, in the step S108, the cooled mixture material can be taken from the mold cavity 204a to obtain the recognizable covering plate or the recognizable component. It is understood that, a cooling step may be provided between the step S107 and the step S108, thereby accelerating the cooling of the mixture material. Furthermore, in some embodiments, in order to allow the recognizable covering plate or the recognizable component to be taken from the mold 200 conveniently, the mold 200 may comprise an ejection device (not shown) for ejecting the recognizable covering plate or the recognizable component out of the mold 200. Detailed descriptions are omitted.

Accordingly, the exposed surface 441 of the recognizable covering plate 44 of the transmission cable 400 can have a non-uniform pattern, and the exposed surface 451 of the recognizable covering plate 45 of the transmission cable 400 can have a non-uniform pattern, thereby improving the recognizability of the transmission cable 400. Moreover, after the transmission cable 400 is used for a period of time, the colors on the exposed surfaces 441, 451 do not fade due to physical wears.

Moreover, it is understood that, in order to correspond to different materials and different product sizes, the pressure and the material feeding speed of the mold may be adjusted correspondingly. Detailed descriptions are omitted.

In some embodiments, the melting point of the color material is in a range between 205 Celsius degrees and 235 Celsius degrees, and the melting point of the plastic material is in a range between 190 Celsius degrees and 210 Celsius degrees.

Through steps of the material mixing and adjustment of the environment temperature of the mixture material (namely, in this embodiment, the step S101 to S105), the plastic material and the color material with different melting points can accordingly form a non-uniform pattern when the materials are injected into the mold cavity 204a of the mold 200. In this embodiment, since the mixing condition of the plastic material and the color material in one recognizable covering plate is different from the mixing condition of the plastic material and the color material in another recognizable covering plate, the recognizable covering plates 44, 45 or the recognizable components have different patterns. Accordingly, when the recognizable covering plate 44, 45 or the recognizable component is arranged on the accessory or the peripheral product of the electronic device (e.g., a transmission cable, a power adapter, a cigarette lighter, a Bluetooth speaker, a wireless charging plate, wired/wireless earphone, extension device for power, data, or media, or the like), the uniqueness of the accessory or the peripheral product of the electronic device will be improved.

In some embodiments, the preparation chamber 300 may be connected to a propulsion screw 320. The propulsion screw 320 is controlled by a propulsion motor 340 so as to be moved back and forth in the preparation chamber 300. Owing to the propulsion of the propulsion screw 320, the mixture material is sequentially moved from the first heating section 301 to the second heating section 302, the third heating section 303, and the fourth heating section 304 of the preparation chamber 300. Therefore, the plastic material and the color material with different melting points can have propulsion force, and after the materials are injected into the mold 200, since the materials have different mobility, the non-uniform pattern can be generated more easily. In some other embodiments, the preparation chamber 300 is tilted, so that the mixture material inside the preparation chamber 300 can be moved from the first heating section 301 to the fourth heating section 304 of the preparation chamber 300. In such configuration, the plastic material and the color material with different melting points can have propulsion force, and after the materials are injected into the mold 200, since the materials have different mobility, the non-uniform pattern can be generated.

In some embodiments, as mentioned above, the recognizable covering plate 44 is on the first covering portion 412, and the transmission cable 400 may further comprises a recognizable covering plate 45 on the second covering portion 422, thereby allowing the transmission cable 400 to have a uniform product design. Moreover, the color of the color material for the recognizable covering plate 44 on the first covering portion 412 may be the same as or different from the color of the color material for the recognizable covering plate 45 on the second covering portion 422, thereby providing different recognition effects and thus allowing the transmission cable 400 to have a better recognizability.

In this embodiment, the recognizable covering plate 44 is a rectangular plate and is assembled on the first covering plate 412, but embodiments are not limited thereto. In some embodiments, the recognizable covering plate 44 may have different shapes by adjusting the shape of the mold cavity 204a of the mold 200.

Figure 4:
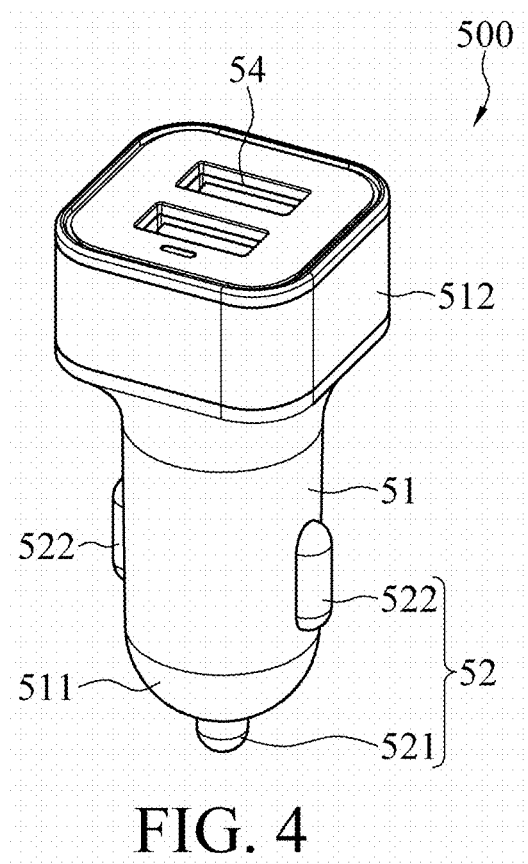
FIG. 4 illustrates a perspective view of a car charger with recognizable shell according to an exemplary embodiment of the instant disclosure.
Figure 4A:
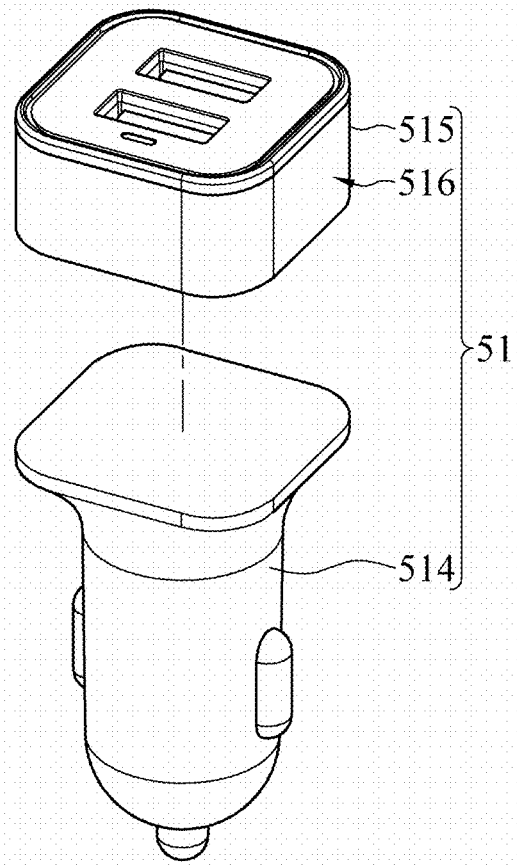
FIG. 4A illustrates a partial exploded view of the car charger with recognizable shell of the exemplary embodiment.
Figure 4B:
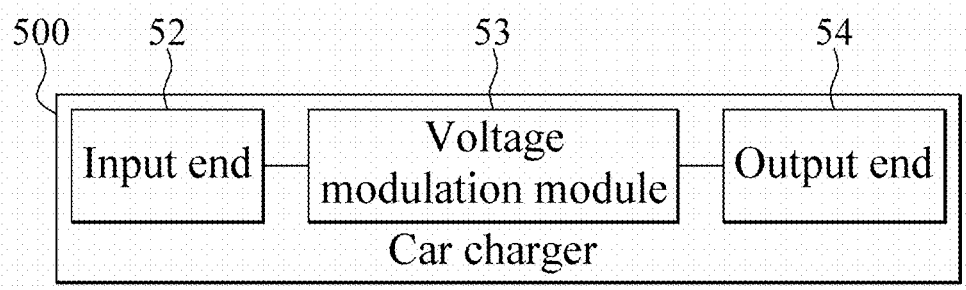
FIG. 4B illustrates a circuit diagram of the car charger with recognizable shell of the exemplary embodiment.

Please refer to FIGS. 4, 4A, and 4B. A car charger with recognizable shell is illustrated. In this embodiment, the electronic device with recognizable shell is a car charger 500, and the recognizable shell 51 of the car charger 500 has a first end 511 and a second end 512. The first end 511 is opposite to the second end 512. The electronic component comprises a first conductive member 521, a second conductive member 522, and a voltage modulation module 523. As shown in FIGS. 4, 4A, and 4B, in this embodiment, the car charger 500 comprises a recognizable shell 51, an input end 52, a voltage modulation module 53, and an output end 54. The car charger 500 is adapted to be electrically connected to a connector of a transportation, and the connector is further electrically connected to a power supply (for example, but not limited to the battery of the automobile) of the transportation. Accordingly, the car charger 500 can receive the external direct current supplied by the power supply. Moreover, when the output end 54 of the car charger 500 is connected to a portable electronic device through a transmission cable, the external direct current can be provided to the portable electronic device from the power supply of the transportation. In this embodiment, the transportation may be, but not limited to, a car. In some embodiments, the transportation may be a motorcycle or other transportations. Moreover, in this embodiment, the portable electronic device may be, but not limited to, a smart phone. In some embodiments, the portable electronic device may be a notebook computer, a tablet computer, a digital camera, or the like.

Please refer to FIGS. 4, 4A, and 4B. The recognizable shell 51 has a first end 511 and a second end 512 opposite to the first end 511. For example, in this embodiment, the recognizable shell 51 is a bar structure, and the first end 511 and the second end 512 are respectively two opposite ends of the bar structure, but embodiments are not limited thereto. Moreover, in some embodiments, the recognizable shell 51 is made of insulated materials, thereby preventing the electrical components in the recognizable shell 51 from being interfered by external electrical signals. Moreover, the recognizable shell 51 has a receiving room for receiving the input end 52 and the voltage modulation module 53.

Please refer to FIGS. 4, 4A, and 4B. In this embodiment, the input end 52 comprises a first conductive member 521 and a second conductive member 522 at the receiving room of the recognizable shell 51. The first conductive member 521 protrudes from the first end 511 and is adapted to be in contact with an electrode terminal of the connector, and the second conductive member 522 protrudes from one side of the recognizable shell 51 and is adapted to be in contact with another electrode terminal of the connector. Accordingly, the first conductive member 521, the second conductive member 522, and the connector of the transportation form a close loop, such that the external direct current provided by the power supply of the transportation can be provided to the output end 54 of the car charger 500. In this embodiment, the number of the second conductive members 522 is two, but embodiments are not limited thereto. In some embodiments, the number of the second conductive member 522 may be one, three, or more than three.

Please refer to FIGS. 4, 4A, and 4B. In this embodiment, the voltage modulation module 53 is also in the receiving room and is electrically connected to the first conductive member 521 and the second conductive member 522. The voltage modulation module 53 is adapted to receive an external direct current through the first conductive member 521 and the second conductive member 522 and to convert the external direct current into a first direct current, where the first direct current is different from the external direct current. In other words, the voltage modulation module 53 may be a voltage modulation circuit for changing the voltage. For example, the voltage of the external direct current may be 12 V, and the voltage of the first direct current may be 5V.

Please refer to FIGS. 4, 4A, and 4B. In this embodiment, the output end 54 is at the second end 512. The output end 54 is electrically connected to the voltage modulation module 53 so as to be adapted to output the first direct current. The output end 54 for example, may be but not limited to, a USB (universal serial bus) connection port. The output end 54 may be of other transmission interfaces, such as, HDMI, micro HDMI, micro USB interfaces, or the like, so that the output end 54 is capable of being connected to a portable electronic device.

Please refer to FIGS. 4, 4A, and 4B. In this embodiment, the recognizable shell 51 has an exposed surface, and the exposed surface has a non-uniform pattern, but embodiments are not limited thereto. In some embodiments, a portion of the recognizable shell 51 has an exposed surface, and the exposed surface has a non-uniform pattern. In other words, the non-uniform pattern may be on the entire recognizable shell 51 or may be on a portion of the recognizable shell 51, and the portion of the recognizable shell 51 corresponding to the exposed surface is manufactured by the aforementioned manufacturing method. As shown in FIGS. 4, 4A, and 4B. In this embodiment, the recognizable shell 51 further comprises a main body 514 and a recognizable covering plate 515 on the main body 514, and the recognizable covering plate 515 has an exposed surface 516, but embodiments are not limited thereto. In some embodiments, the main body 514 and the recognizable covering plate 515 may be integrally formed as a one-piece member, and the recognizable covering plate 515 is manufactured by the aforementioned manufacturing method. Detailed descriptions are omitted.

Figure 5:
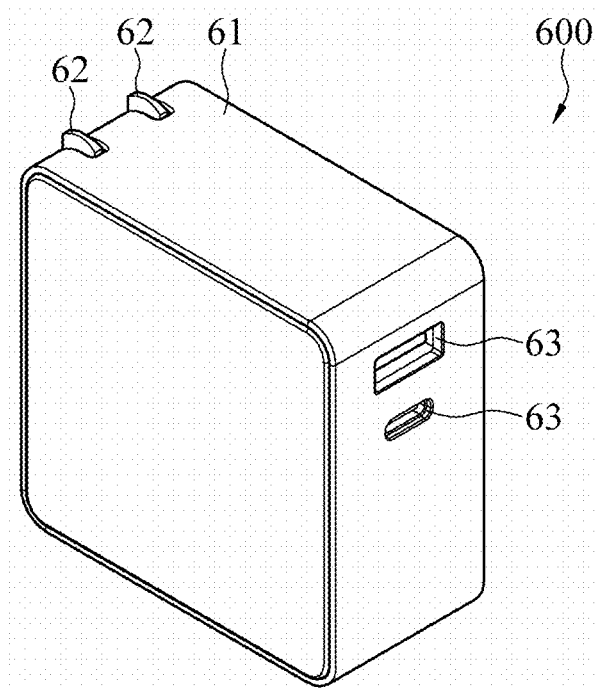
FIG. 5 illustrates a perspective view of a power adapter with recognizable shell according to an exemplary embodiment of the instant disclosure.
Figure 5A:
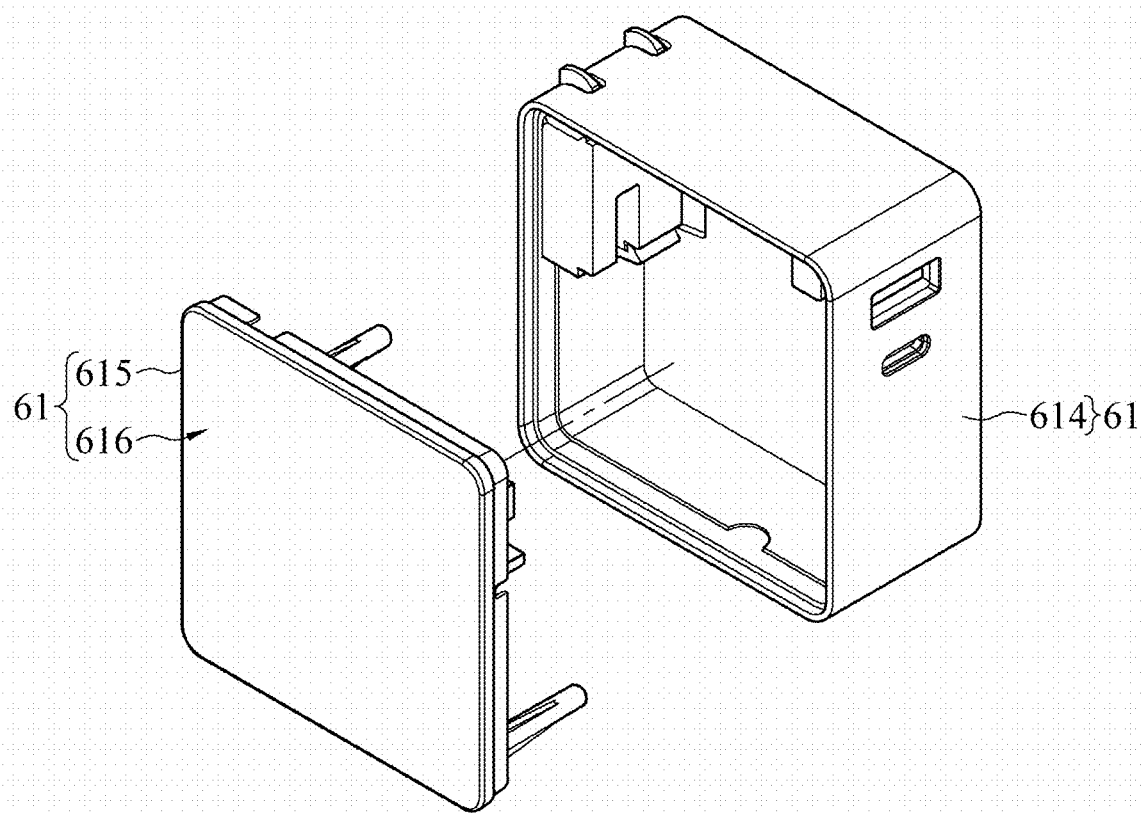
FIG. 5A illustrates a partial exploded view of the power adapter with recognizable shell of the exemplary embodiment.
Figure 5B:
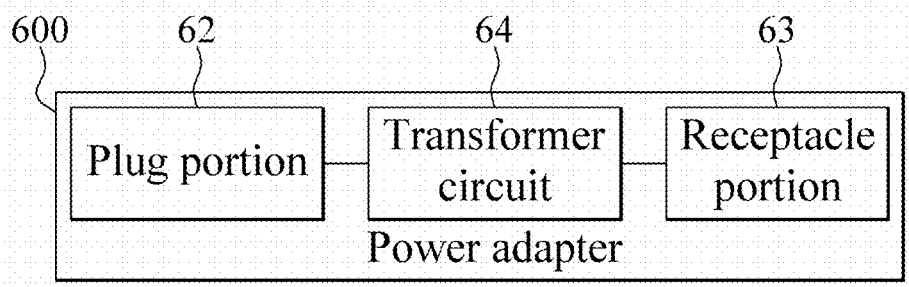
FIG. 5B illustrates a circuit diagram of the power adapter with recognizable shell of the exemplary embodiment.
Figure 6A:
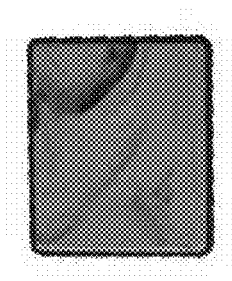
FIG. 6A to FIG. 6F illustrate schematic views of the recognizable covering plates according to some exemplary embodiments of the instant disclosure.
Figure 6B:
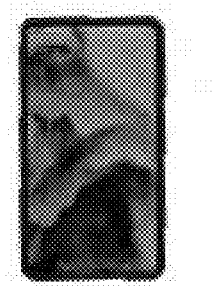
Figure 6C:
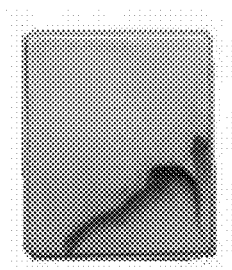
Figure 6D:
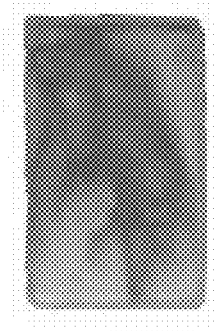
Figure 6E:
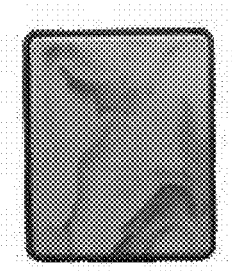
Figure 6F:
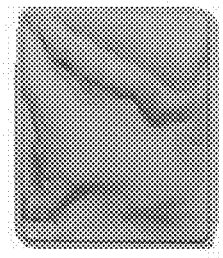

Please refer to FIGS. 5, 5A, and 5B. A power adapter with recognizable shell is illustrated. In this embodiment, the electronic device with recognizable shell is a power adapter 600, and the electronic component comprises a transformer circuit 64. As shown in FIGS. 5, 5A, and 5B, in this embodiment, the power adapter 600 comprises a recognizable shell 61, a plug portion 62, a receptacle portion 63, and a transformer circuit 64. The power adapter 600 is adapted to be connected to a mains supply, and the power adapter 600 is adapted to be connected to a portable electronic device through a transmission cable; thereby, the power adapter 600 converts the alternating current of the mains supply into a direct current for the portable electronic device.

Please refer to FIGS. 5, 5A, and 5B. In this embodiment, the recognizable shell 61 has a receiving room for receiving the transformer circuit 64. The plug portion 62 and the receptacle portion 63 are respectively at different sides of the recognizable shell 61. In this embodiment, the plug portion 62 and the receptacle portion 63 are respectively at opposite sides of the recognizable shell 61, but embodiments are not limited thereto. In some embodiments, the plug portion 62 and the receptacle portion 63 are at adjacent sides of the recognizable shell 61. In this embodiment, the plug portion 62 is adapted to be connected to the receptacle of the mains supply, and the receptacle portion 63 is adapted to be connected to the connector of the transmission cable, so that the power adapter 600 is adapted to provide current to a portable electronic device for charging the portable electronic device.

Further, as shown in FIGS. 5, 5A, and 5B. In this embodiment, the transformer circuit 64 is received in the receiving room and is electrically connected to the plug portion 62 and the receptacle portion 63. The transformer circuit 64 is adapted to receive an external alternating current through the plug portion 62 and convert the external alternating current into a direct current, so that the transformer circuit 64 can provide the direct current to the portable electronic device for charging through the receptacle portion 63.

Please refer to FIGS. 5, 5A, and 5B. In this embodiment, the recognizable shell 61 has an exposed surface, and the exposed surface has a non-uniform pattern, but embodiments are not limited thereto. In some embodiments, a portion of the recognizable shell 61 has an exposed surface, and the exposed surface has a non-uniform pattern. In other words, the non-uniform pattern may be on the entire recognizable shell 61 or may be on a portion of the recognizable shell 61, and the portion of the recognizable shell 61 corresponding to the exposed surface is manufactured by the aforementioned manufacturing method. As shown in FIGS. 5, 5A, and 5B. In this embodiment, the recognizable shell 61 further comprises a main body 614 and a recognizable covering plate 615 on the main body 614, and the recognizable covering plate 615 has an exposed surface 616, but embodiments are not limited thereto. In some embodiments, the main body 614 and the recognizable covering plate 615 may be integrally formed as a one-piece member, and the recognizable covering plate 615 is manufactured by the aforementioned manufacturing method. Detailed descriptions are omitted.

Moreover, in some embodiments, the portion of the first recognizable shell 413 of the transmission cable 400 having the non-uniform pattern is manufactured by double injection molding, and the portion of the second recognizable shell 423 of the transmission cable 400 having the non-uniform pattern is manufactured by double injection molding. In some embodiments, the recognizable covering plate 44 of the first recognizable shell 413 of the transmission cable 400 is manufactured by double injection molding and the recognizable covering plate 44 of the second recognizable shell 423 of the transmission cable 400 is manufactured by double injection molding.

Similarly, in some embodiments, the portion of the recognizable shell 51 of the car charger 500 having the non-uniform pattern is manufactured by double injection molding. In some embodiments, the recognizable covering plate 515 of the recognizable shell 51 of the car charger 500 is manufactured by double injection molding.

Similarly, in one or some embodiments, the portion of the recognizable shell 61 of the power adapter 600 having the non-uniform pattern is manufactured by double injection molding. In one or some embodiments, the recognizable covering plate 615 of the recognizable shell 61 of the power adapter 600 is manufactured by double injection molding.

Please refer to FIGS. 6A to 6F. Schematic views of the recognizable covering plates according to some exemplary embodiment of the instant disclosure are illustrated. Accordingly, the recognizable covering plates manufactured at different times can have different non-uniform patterns, thereby having recognizability.

Based on the above, according to one or some embodiment of the instant disclosure, a recognizable covering plate or recognizable shell having a non-uniform pattern is provided. Therefore, when the recognizable covering plate or recognizable shell is arranged on the accessory or the peripheral product (e.g., the transmission cable, the power adapter, the car charger, the Bluetooth speaker, the wireless charging plate, the wired/wireless earphone, extension device for power, data, or media, or the like), the accessory or the peripheral product of the electronic device will have a unique recognizability due to the non-uniform pattern on the covering plate or shell. Furthermore, after the accessory or the peripheral product of the electronic device is used for a period of time, the color on the surface of the accessory or the peripheral product does not fade due to physical wears to the non-uniform pattern.

What is claimed is:
1. An electronic device with recognizable shell, comprising:
a recognizable shell; and
an electronic component received in the recognizable shell;
wherein the recognizable shell has an exposed surface, the exposed surface has a non-uniform pattern, a portion of the recognizable shell corresponding to the exposed surface is manufactured by a manufacturing method, the manufacturing method comprises:
mixing a plastic material and a color material so as to obtain a mixture material, wherein a melting point of the color material is higher than a melting point of the plastic material;
propelling the mixture material and increasing an environment temperature of the mixture material to a preheating temperature, wherein the preheating temperature is lower than the melting point of the plastic material;

continuously propelling the mixture material and increasing the environment temperature of the mixture material to above the preheating temperature until the plastic material is in liquid state and the color material is in solid state, such a mobility of the plastic material is higher than a mobility of the color material;

continuously propelling the mixture material and increasing the environment temperature of the mixture material to a temperature 5 to 10 degrees above the melting point of the plastic material;

continuously propelling the mixture material and increasing the environment temperature of the mixture material to above the melting point of the color material until the plastic material and the color material are in liquid state;

injecting the mixture material in a mold cavity of a mold;

maintaining the mold under a molding pressure; and obtaining a cooled mixture material as the portion of the recognizable shell.

2. The electronic device with recognizable shell according to claim 1, wherein the preheating temperature is lower than the melting point of the plastic material by 15 to 35 degrees.

3. The electronic device with recognizable shell according to claim 1, wherein the melting point of the color material is higher than the melting point of the plastic material by 5 to 45 degrees.

4. The electronic device with recognizable shell according to claim 1, wherein in the step of increasing the environment temperature of the mixture material to above the preheating temperature, the environment temperature of the mixture material is increased to a temperature about 5 degrees above the preheating temperature.

5. The electronic device with recognizable shell according to claim 1, wherein in the step of increasing the environment temperature of the mixture material to above the melting point of the color material, the environment temperature of the mixture material is increased to a temperature about 10 degrees above the melting point of the color material.

6. The electronic device with recognizable shell according to claim 1, wherein a weight percentage of the color material is about in a range between 0.5% and 6.5% in the mixture material.

7. The electronic device with recognizable shell according to claim 1, wherein the plastic material comprises at least one selected from a group consisting of acrylonitrile butadiene styrene (ABS) copolymer, polypropylenes, polycarbonate, thermoplastic elastomer, thermoplastic polyurethane, and silicone.

8. The electronic device with recognizable shell according to claim 1, wherein the plastic material and the color material are mixed in a preparation chamber, the preparation chamber comprises a first heating section, a second heating section, a third heating section, and a fourth heating section in communication with each other, wherein in the first heating section of the preparation chamber, the environment temperature of the mixture material is increased to the preheating temperature, wherein in the second heating section of the preparation chamber, the environment temperature of the mixture material is increased to above the preheating temperature, wherein in the third heating section of the preparation chamber, the environment temperature of the mixture material is increased to the temperature 5 to 10 degrees above the melting point of the plastic material, and wherein in the fourth heating section of the preparation chamber, the environment temperature of the mixture material is increased to above the melting point of the color material, and the mixture material is injected into the mold cavity of the mold.

9. The electronic device with recognizable shell according to claim 1, wherein the exposed surface is manufactured by double injection molding.

10. The electronic device with recognizable shell according to claim 1, wherein the electronic device is a transmission cable, the recognizable shell further comprises a first recognizable shell and a second recognizable shell, the electronic component comprises a connector and a connection port, and wherein the electronic device further comprises:

a first connection end having the connector and the first recognizable shell;

a second connection end having the connection port and the second recognizable shell; and a cable body for electrically connecting the connector with the connection port;

wherein the first recognizable shell has the exposed surface.

11. The electronic device with recognizable shell according to claim 10, wherein the first recognizable shell further comprises a first covering portion and a recognizable covering plate on the first covering portion, the recognizable covering plate has the exposed surface, and the recognizable covering plate is manufactured by the manufacturing method.

12. The electronic device with recognizable shell according to claim 11, wherein the second recognizable shell has another exposed surface, the another exposed surface has another non-uniform pattern, and a portion of the second recognizable shell corresponding to the another exposed surface is manufactured by the manufacturing method.

13. The electronic device with recognizable shell according to claim 12, wherein the second recognizable shell further comprises a second covering portion and another recognizable covering plate disposed on the second covering portion, the another recognizable covering plate has the another exposed surface, and the another recognizable covering plate is manufactured by the manufacturing method.

14. The electronic device with recognizable shell according to claim 1, wherein the electronic device is a car charger, the recognizable shell further has a first end and a second end opposite to the first end, the electronic component comprises a first conductive member, a second conductive member, and a voltage modulation module, and wherein the electronic device further comprises:

an input end comprising:

the first conductive member in the recognizable shell and protruding out of the first end;

the second conductive member in the recognizable shell and protruding out of one side of the recognizable shell; and the voltage modulation module in the recognizable shell, wherein the voltage modulation module is electrically connected to the first conductive member and the second conductive member, the voltage modulation module is adapted to receive an external direct current through the first conductive member and the second conductive member and to convert the external direct current into a direct current, wherein a voltage of the external direct current is different from a voltage of the direct current; and an output end at the second end, wherein the output end is electrically connected to the voltage modulation module so as to be adapted to output the direct current.

15. The electronic device with recognizable shell according to claim 14, wherein the recognizable shell further comprises a main body and a recognizable covering plate on the main body, the recognizable covering plate has the exposed surface, and the recognizable covering plate is manufactured by the manufacturing method.

16. The electronic device with recognizable shell according to claim 1, wherein the electronic device is a power adapter, the electronic component comprises a transformer circuit, and wherein the electronic device further comprises:
 a plug portion at one side of the recognizable shell; and
 a receptacle portion, wherein the plug portion and the receptacle portion are at different sides of the recognizable shell;
 wherein the transformer circuit is received in the recognizable shell for electrically connected to the plug portion and the receptacle portion, and wherein the transformer circuit is adapted to receive an external alternating current through the plug portion and to convert the external alternating current into a direct current.

17. The electronic device with recognizable shell according to claim 16, wherein the recognizable shell further comprises a main body and a recognizable covering plate on the main body, the recognizable covering plate has the exposed surface, and the recognizable covering plate is manufactured by the manufacturing method.

18. A manufacturing method for recognizable covering plate, comprising:
 mixing a plastic material and a color material so as to obtain a mixture material, wherein a melting point of the color material is higher than a melting point of the plastic material;
 propelling the mixture material and increasing an environment temperature of the mixture material to a preheating temperature, wherein the preheating temperature is lower than the melting point of the plastic material;
 continuously propelling the mixture material and increasing the environment temperature of the mixture material to above the preheating temperature until the plastic material is in liquid state and the color material is in solid state, such a mobility of the plastic material is higher than a mobility of the color material;
 continuously propelling the mixture material and increasing the environment temperature of the mixture material to a temperature 5 to 10 degrees above the melting point of the plastic material;
 continuously propelling the mixture material and increasing the environment temperature of the mixture material to above the melting point of the color material until the plastic material and the color material are in liquid state;
 injecting the mixture material in a mold cavity of a mold;
 maintaining the mold under a molding pressure; and
 obtaining a cooled mixture material as a recognizable covering plate.

19. The manufacturing method for recognizable covering plate according to claim 18, wherein the preheating temperature is lower than the melting point of the plastic material by 15 to 35 degrees, wherein the melting point of the color material is higher than the melting point of the plastic material by 5 to 45 degrees, wherein in the step of increasing the environment temperature of the mixture material to above the preheating temperature, the environment temperature of the mixture material is increased to a temperature about 5 degrees above the preheating temperature, wherein in the step of increasing the environment temperature of the mixture material to above the melting point of the color material, the environment temperature of the mixture material is increased to a temperature about 10 degrees above the melting point of the color material, wherein a weight percentage of the color material is about in a range between 0.5% and 6.5% in the mixture material, and wherein the plastic material comprises at least one selected from a group consisting of acrylonitrile butadiene styrene (ABS) copolymer, polypropylenes, polycarbonate, thermoplastic elastomer, thermoplastic polyurethane, and silicone.

20. The manufacturing method for recognizable covering plate according to claim 18, wherein the plastic material and the color material are mixed in a preparation chamber, the preparation chamber comprises a first heating section, a second heating section, a third heating section, and a fourth heating section in communication with each other, wherein in the first heating section of the preparation chamber, the environment temperature of the mixture material is increased to the preheating temperature, wherein in the second heating section of the preparation chamber, the environment temperature of the mixture material is increased to above the preheating temperature, wherein in the third heating section of the preparation chamber, the environment temperature of the mixture material is increased to the temperature 5 to 10 degrees above the melting point of the plastic material, and wherein in the fourth heating section of the preparation chamber, the environment temperature of the mixture material is increased to above the melting point of the color material, and the mixture material is injected into the mold cavity of the mold.

* * * * *